US010077394B2

(12) United States Patent
Abbas et al.

(10) Patent No.: US 10,077,394 B2
(45) Date of Patent: Sep. 18, 2018

(54) MODIFIED NONIONIC SURFACTANT FORMULATIONS FOR ENHANCED OIL RECOVERY

(75) Inventors: Sayeed Abbas, Pearland, TX (US); Aaron Sanders, Missouri City, TX (US)

(73) Assignee: Dow Global Technologies LLC, Midland, MI (US)

(*) Notice: Subject to any disclaimer, the term of this patent is extended or adjusted under 35 U.S.C. 154(b) by 85 days.

(21) Appl. No.: 14/124,875

(22) PCT Filed: Jun. 8, 2012

(86) PCT No.: PCT/US2012/041579
§ 371 (c)(1),
(2), (4) Date: Dec. 9, 2013

(87) PCT Pub. No.: WO2012/170835
PCT Pub. Date: Dec. 13, 2012

(65) Prior Publication Data
US 2014/0110117 A1  Apr. 24, 2014

Related U.S. Application Data

(60) Provisional application No. 61/495,601, filed on Jun. 10, 2011.

(51) Int. Cl.
*C09K 8/594* (2006.01)
*C09K 8/584* (2006.01)
(Continued)

(52) U.S. Cl.
CPC .............. *C09K 8/584* (2013.01); *C09K 8/594* (2013.01); *E21B 43/164* (2013.01); *E21B 43/166* (2013.01); *C09K 8/703* (2013.01)

(58) Field of Classification Search
CPC ........ C09K 8/584; C09K 8/594; C09K 8/602; E21B 43/16; E21B 43/166; E21B 43/168; D21B 43/164
See application file for complete search history.

(56) References Cited

U.S. PATENT DOCUMENTS 3,342,256 A    9/1967  Bernard et al.
4,380,266 A    4/1983  Wellington
(Continued)

OTHER PUBLICATIONS

Dazun et al. "CO2 Soluble Surfactants for Improved Mobility Control", SPE 129907, Apr. 24, 2010 pp. 1-20.*
(Continued)

*Primary Examiner* — William D Hutton, Jr.
*Assistant Examiner* — Charles R Nold
(74) *Attorney, Agent, or Firm* — Brooks, Cameron & Huebsch, PLLC

(57) ABSTRACT

Embodiments of the present disclosure include modified nonionic surfactant formulations having a nonionic surfactant and a pour point depressant, where the modified nonionic surfactant formulations have a pour point of −3° C. to −54° C. In one or more embodiments, the modified nonionic surfactant formulations can be introduced into a flow of carbon dioxide, where the flow of carbon dioxide and the modified nonionic surfactant formulation are injected into an oil containing reservoir. In one or more embodiments, an emulsion of the carbon dioxide and the nonionic surfactant form in the oil containing reservoir, where the use of the pour point depressant provides minimal interference in forming the emulsion.

8 Claims, 2 Drawing Sheets

(51) Int. Cl.
*E21B 43/16* (2006.01)
*C09K 8/70* (2006.01)

(56) References Cited

U.S. PATENT DOCUMENTS

| | | | | |
|---|---|---|---|---|
| 4,554,082 | A | * | 11/1985 | Holtmyer et al. ............ 507/240 |
| 4,799,547 | A | | 1/1989 | Borchardt |
| 6,457,524 | B1 | * | 10/2002 | Roddy .......................... 166/293 |
| 2002/0004541 | A1 | | 1/2002 | Lewis et al. |
| 2009/0178807 | A1 | * | 7/2009 | Kaufman et al. ............. 166/276 |
| 2009/0289220 | A1 | | 11/2009 | Klagge et al. |
| 2010/0311620 | A1 | * | 12/2010 | Kakadjian et al. ........... 507/136 |
| 2011/0198101 | A1 | * | 8/2011 | Sanders ............. C08G 65/2609 166/402 |
| 2012/0067586 | A1 | * | 3/2012 | Koczo ...................... C09K 8/38 166/309 |
| 2013/0068470 | A1 | * | 3/2013 | Poindexter ............ C09K 8/594 166/372 |

OTHER PUBLICATIONS

International Search Report and Written Opinion from related PCT Application PCT/US2012/041579 dated Sep. 13, 2012, 13 pgs.

* cited by examiner

MODIFIED NONIONIC SURFACTANT FORMULATIONS FOR ENHANCED OIL RECOVERY

This application is a National Stage Application under 35 U.S.C. § 371 of PCT/US2012/041579, filed Jun. 8, 2012 and published as WO 2012/170835 on Dec. 13, 2012, which claims the benefit of U.S. Provisional Application Ser. No. 61/495,601, filed Jun. 10, 2011, the entire contents of which are incorporated herein by reference in its entirety.

FIELD OF DISCLOSURE

Embodiments of the present disclosure are directed toward enhanced oil recovery; more specifically, embodiments are directed toward modified nonionic surfactant formulations for enhanced oil recovery.

BACKGROUND

Recovering oil from oil containing reservoirs can include three distinct phases. During a first phase, natural pressure of the oil containing reservoir and/or gravity can drive oil into a wellbore, and combined with an artificial lift technique, such as pumping, bring the oil to the surface. However for some oil recovery processes, in the first phase only about 10 percent of the oil containing reservoirs' original oil in place is recovered.

A second phase, to extend the productive life the oil containing reservoir, can increase oil recovery to 20 to 40 percent of the original oil in place. For some applications, the second phase can include injecting water to displace oil and drive it to a production wellbore. In some applications, re-injection of natural gas has been employed to maintain and/or increase pressure in the oil containing reservoir, as natural gas is often produced simultaneously with the oil recovery.

However, with much of the easy-to-recover oil already recovered via the first phase and/or the second phase, a third phase of oil recovery has been developed. The third phase may be referred to as enhanced oil recovery. Enhanced oil recovery techniques offer prospects for producing more of the oil containing reservoirs' original oil in place, thus further extending the productive life of the oil containing reservoir. One estimate of oil in place that is not recoverable by the first phase of oil recovery or the second phase of oil recovery that could be the targeted by enhanced oil recovery techniques is 377 billion barrels of oil in place. Enhanced oil recovery can include an injection of fluids other than water, such as steam, gas, surfactant solutions, or carbon dioxide.

For some applications the injected fluid is miscible with the hydrocarbons in the oil containing reservoir. This injected fluid can help reduce the viscosity of oil present in the oil containing reservoir in order to increase the flow of oil to the production wellbore.

Enhanced oil recovery, however, can be accompanied with a number of drawbacks. One problem encountered is poor sweep of the oil containing reservoir. Poor sweep can occur when carbon dioxide injected into the oil containing reservoir flows through the paths of least resistance due to the low viscosity of the carbon dioxide, thus bypassing significant portions of the oil containing reservoir and the oil located there. When the carbon dioxide bypasses significant portions of the oil containing reservoir, less oil is contacted with the carbon dioxide, reducing the likelihood that the carbon dioxide will reduce the viscosity of the oil, thus producing poor sweep. In addition, due to the low density of the carbon dioxide, the injected carbon dioxide can rise to the top of the oil containing reservoir and "override" portions of the oil containing reservoir, leading to early breakthrough of the carbon dioxide at the production wellbore, leaving less carbon dioxide within the oil containing reservoir to contact with the oil, again reducing the likelihood that the carbon dioxide will reduce the viscosity of oil.

To increase the enhanced oil recovery process effectiveness, a surfactant can be been used to generate an emulsion in the oil containing reservoir. An emulsion can generate an apparent viscosity of about 100 to about 1,000 times that of the injected carbon dioxide, therefore, the emulsion can inhibit the flow of the carbon dioxide into that portion of the oil containing reservoir that has previously been swept. In other words, the emulsion can serve to block the volumes of the oil containing reservoir through which the carbon dioxide can short-cut, thereby reducing its tendency to channel through highly permeable fissures, cracks, or strata, and directing it toward previously unswept portions of the oil containing reservoir. As such, the emulsion can help force the carbon dioxide to the recoverable hydrocarbons in the less depleted portions of the oil containing reservoir.

SUMMARY

Embodiments of the present disclosure include a method of injecting a modified nonionic surfactant formulation into an oil containing reservoir. Embodiments of the method can include introducing a modified nonionic surfactant formulation having a pour point of $-3°$ C. to $-54°$ C. into a flow of carbon dioxide, the modified nonionic surfactant formulation including a nonionic surfactant and a pour point depressant. The flow of carbon dioxide and the modified nonionic surfactant formulation are injected into the oil containing reservoir where an emulsion of the carbon dioxide and the nonionic surfactant can be formed in an aqueous solution in the oil containing reservoir. In one or more embodiments, the use of the pour point depressant in the modified nonionic surfactant formulation provides minimal interference in forming the emulsion.

In one or more embodiments, the pour point depressant can provide no interference in forming the emulsion. In one or more embodiments, the pour point depressant is 10 to 30 weight percent of the modified nonionic surfactant formulation. In one or more embodiments, the pour point depressant includes water. For example, the modified nonionic surfactant formulation can include 10 to 20 weight percent water. In one or more embodiments, the pour point depressant includes an alcohol. The alcohol can be selected from the group consisting of glycols, glycol ethers, methanol, ethanol and combinations thereof. In one embodiment, the modified nonionic surfactant includes 10 weight percent of the alcohol and 20 weight percent water.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as a exclusive list.

DEFINITIONS

Figure 1A:
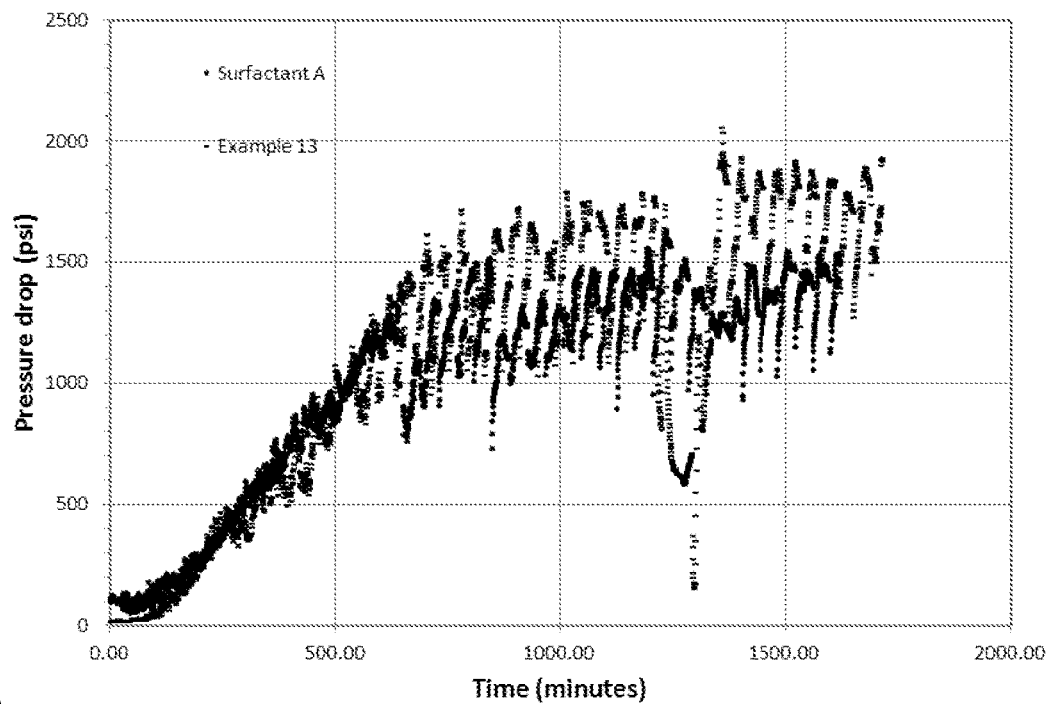
FIGS. 1A-1C provide a pressure drop across a core of a core flooding rig as a function of time for Examples of the Modified Nonionic Surfactant Formulation of the present disclosure.

As used herein, the terms "a," "an," "the," "one or more," and "at least one" are used interchangeably and include plural referents unless the context clearly dictates otherwise.

As used herein, "° C." is an abbreviation for degree Celsius.

Unless defined otherwise, all scientific and technical terms are understood to have the same meaning as commonly used in the art to which they pertain. For the purpose of the present disclosure, additional specific terms are defined throughout.

The terms "comprises," "includes" and variations of these words do not have a limiting meaning where these terms appear in the description and claims. Thus, for example, a process that comprises "a" modified nonionic surfactant formulation can be interpreted to mean a process that includes "one or more" modified nonionic surfactant formulations. In addition, the term "comprising," which is synonymous with "including" or "containing," is inclusive, open-ended, and does not exclude additional unrecited elements or method steps.

As used herein, the term "and/or" means one, more than one, or all of the listed elements.

Also herein, the recitations of numerical ranges by endpoints include all numbers subsumed within that range (e.g., 1 to 5 includes 1, 1.5, 2, 2.75, 3, 3.80, 4, 5, etc.).

As used herein, the term "water" can include, for example, a brine, a connate water, surface water, distilled water, carbonated water, sea water and a combination thereof. For brevity, the word "water" will be used herein (unless clearly indicated otherwise), where it is understood that one or more of "brine," "connate water," "surface water," "distilled water," "carbonated water," and/or "sea water" can be used interchangeably.

As used herein, the term "aqueous solution" can include the water, as defined herein, injected into the oil containing reservoir and other fluids and/or compounds already present in the oil containing reservoir.

As used herein, a "surfactant" refers to a chemical compound that lowers the interfacial tension between two liquids.

As used herein, a "nonionic surfactant" refers to a surfactant where the molecules forming the surfactant are uncharged.

As used herein, the term "supercritical phase" or "supercritical state" means a dense gas that is maintained above its critical temperature or critical pressure (the temperature or pressure above which it cannot be liquefied by pressure or temperature).

As used herein, the term "pour point" refers to the lowest temperature at which a liquid (e.g., the modified nonionic surfactant formulation of the present disclosure) will pour or flow under prescribed conditions, and below which the liquid ceases to flow under the prescribed conditions.

As used herein, the term "emulsion" refers to a system in which liquid and/or droplets of a supercritical fluid are dispersed in a liquid. It is understood that in certain embodiments of the present disclosure that the carbon dioxide can exist as a gas, liquid, or supercritical fluid depending on the temperature and pressure. As used herein an "emulsion" may include a "foam," which refers to a dispersion in which a gas is dispersed in a liquid. As used herein, foam and emulsion can be used interchangeably.

As used herein, parts-per-million (ppm) is used as one measure of concentration in which a given property exists at a relative proportion of one part per million parts examined, as would occur if a modified nonionic surfactant formulation was present at a concentration of one-millionth of a gram per gram of supercritical carbon dioxide.

As used herein, the term "oil" refers to a naturally occurring liquid consisting of a complex mixture of hydrocarbons of various molecular weights and structures, and other organic compounds, which are found in geological formations beneath the earth's surface, referred to herein as an oil containing reservoir. "Oil" is also known, and may be referred to, as petroleum and/or crude oil.

DETAILED DESCRIPTION

Nonionic surfactants based on alcohol alkoxylates used in carbon dioxide emulsion flooding tend to have high pour points which lead to difficulties in handling and transportation of the nonionic surfactants. This is especially true in cold environments where the temperature at which the nonionic surfactants are transported and/or handled can drop to temperature of 0° C. or below. While formulations of nonionic surfactants with low pour points are known, the additives (e.g., certain alcohols, glycols and other surfactants) that allow for these low pour points may interfere with the formation of emulsion and/or emulsion stability in oil containing reservoirs in which enhanced oil recovery processes are being conducted.

In contrast, the present disclosure provides modified nonionic surfactant formulations that not only may reduce the pour point, allowing the modified nonionic surfactant formulations to be transported and/or handled at temperatures of 0° C. or below, but may also cause little to no interference with emulsion formation and/or emulsion stability of carbon dioxide and water in an oil containing reservoir. In one or more embodiments, an additional advantage of the modified nonionic surfactant formulations of the present disclosure is that the pour point depressant(s) used in the formulations may also help to lower the cloud point and improve the solubility of the modified nonionic surfactant formulations in supercritical carbon dioxide.

Embodiments of the present disclosure provide methods for enhanced oil recovery processes. Embodiments of the methods of the present disclosure include introducing (e.g., injecting) a modified nonionic surfactant formulation into a flow of carbon dioxide being injected into an oil containing reservoir. Embodiments of the modified nonionic surfactant formulation can include a nonionic surfactant and a pour point depressant. In one or more embodiments, the pour point depressant can bring a pour point of the modified nonionic surfactant formulation from −3° C. to −54° C. Other values for the pour point of the modified nonionic surfactant formulation of the present disclosure are possible. These values can include −40° C., −30° C., −20° C. or −10° C., as discussed herein.

The flow of carbon dioxide and the modified nonionic surfactant formulation can be injected into an oil containing reservoir, where an emulsion of the carbon dioxide and the nonionic surfactant can form in an aqueous solution in the oil containing reservoir. In one or more embodiments, the aqueous solution in the oil containing reservoir can include water, as defined herein, that has been injected, or introduced, into the oil containing reservoir. As provided herein, the pour point depressant of the modified nonionic surfactant formulation provides minimal interference in forming the emulsion.

With respect to determining the level of interference of a pour point depressant in forming the emulsion, one approach could be to determine what changes (if any) to the apparent viscosity of the emulsion are observed due to the presence of the pour point depressant. For example, as discussed herein, to increase the effectiveness of enhanced oil recovery process the surfactant can be been used to help generate an emulsion in the oil containing reservoir. The emulsion can generate an apparent viscosity of about 100 to about 1,000 times that of the injected carbon dioxide, thereby helping to inhibit the flow of carbon dioxide into those portions of the oil containing reservoir that had previously been swept. As such, the emulsion can help force the carbon dioxide to the recoverable hydrocarbons in the less depleted portions of the oil containing reservoir. In one or more embodiments, if the addition of the pour point depressant to the surfactant results in an apparent viscosity that is not able to achieve this lower value of about 100 times that of the injected carbon dioxide, then the pour point depressant can be considered to interfere in forming the emulsion.

Embodiments for measuring the extent of interference in forming the emulsion can be determined in a number of different ways. For example, testing the degree of interference in forming an emulsion can be determined by testing the modified nonionic surfactant formulation against a nonionic surfactant formulation that is identical to the modified nonionic surfactant formulation except for the pour point depressant of the present disclosure is not present therein. Results of such side-by-side tests can demonstrate that the pour point depressant used to form the modified nonionic surfactant formulation of the present disclosure may cause little to no interference with emulsion formation and/or emulsion stability of carbon dioxide and water that could be formed in an oil containing reservoir. Specific proposed examples of such testing are provided herein.

In one or more embodiments, the modified nonionic surfactant formulation of the present disclosure can be introduced into the flow of carbon dioxide, where the carbon dioxide and the modified nonionic surfactant formulation are then injected into the oil containing reservoir. In one or more embodiments, 100 parts per million to 5,000 parts per million of the modified nonionic surfactant formulation can be introduced into the flow of carbon dioxide. Other ranges are possible, where the selection of the concentration of the modified nonionic surfactant formulation introduced into the flow of carbon dioxide can depend upon the physical and chemical conditions present in the oil containing reservoir.

Carbon dioxide ($CO_2$) can exist in four distinct phases depending upon its temperature and pressure. The four phases are as a solid, a liquid, a vapor (or gas), and a supercritical fluid. A supercritical fluid is a defined state of a compound, mixture or element above its critical pressure and critical temperature. The supercritical fluid may behave as a liquid with respect to density, while behaving like a vapor with respect to viscosity. Carbon dioxide as a supercritical fluid is stable above a critical pressure of 6.9 megapascal (MPa) and a critical temperature of 31° C. For one or more embodiments of the present disclosure the carbon dioxide can be in a fluid state either as a liquid and/or as a supercritical fluid. As such, "carbon dioxide" and/or "supercritical carbon dioxide", both used herein, are considered to be in a supercritical state that can vacillate between a supercritical phase and a liquid phase depending on the temperature.

The flow of carbon dioxide may be provided to the oil containing reservoir via an injection well, e.g., a wellbore. The oil containing reservoir may include a plurality of injection wells. The pressure utilized to inject the carbon dioxide at a given rate can be a function of oil containing reservoir parameters that include, but are not limited to, permeability, zone thickness, and a bottom-hole pressure exerted by a column of the carbon dioxide in the wellbore. For one or more embodiments, the flow of carbon dioxide to the oil containing reservoir can be at a pressure of from 800 pound-force per square inch (5516 kPa) to 3000 pound-force per square inch (20684 kPa). For some applications, the flow of carbon dioxide may be provided to the oil containing reservoir at a pressure that can be greater than a miscibility pressure of a particular oil containing reservoir. Miscibility pressure refers to the minimum pressure at which the carbon dioxide and the oil in the oil containing reservoir are miscible. The miscibility pressure may vary due, at least in part, to the chemical makeup of the oil in the oil containing reservoir and/or the oil containing reservoir temperature. For one or more embodiments, the flow of carbon dioxide to the oil containing reservoir can be at a temperature of 25° C. to 70° C. For one or more embodiments, the flow of carbon dioxide to the oil containing reservoir can be at a temperature of 25° C. to 100° C. As such, the carbon dioxide can be in a fluid state that vacillates between a supercritical phase and a liquid phase.

The carbon dioxide, which is much less viscous than oil or water, may move faster in some regions and directions than others to create viscous fingers through which a significant portion of the injected fluids may flow. Some of these fingers may arrive prematurely at a production well; lowering the effectiveness of both the injected carbon dioxide and of the production well's pumping capacity. Additionally, gravity separation of the water and carbon dioxide can result in gravity override, where the more dense water flows in a lower zone of the oil containing reservoir and the less dense carbon dioxide flows in an upper zone of the oil containing reservoir. The use of an emulsion (e.g., an emulsion of carbon dioxide/water) helps reduce viscous fingering and/or gravity override that may result, at least in part, due to the relative lower viscosity and density of the carbon dioxide. Moreover, since fluids flow preferentially into areas of high permeability in the oil containing reservoir, and emulsion formation is proportional to flow, the emulsion may greatly increase local resistance to flow preferentially in the high permeability zone, thereby diverting injected fluids to areas of lower permeability and improving process efficiency for the oil recovery.

In one or more embodiments, the modified nonionic surfactant formulations discussed herein can be injected with and into the supercritical carbon dioxide being pumped into the oil containing reservoir containing oil. When injected with the supercritical carbon dioxide the modified nonionic surfactant formulations can help promote the formation of an emulsion of carbon dioxide and water. It is preferable to inject the modified nonionic surfactant formulations into the supercritical carbon dioxide, as opposed to injecting into or with water, for at least two reasons. First, in order to achieve an emulsion the carbon dioxide, modified nonionic surfactant formulations and water must be present in intimate contact within the oil containing reservoir where the carbon dioxide is flowing. If the modified nonionic surfactant formulations were dissolved in the water there is a greater likelihood that these two components will tend to the bottom regions (e.g., the water being more dense than the carbon dioxide will tend to the lower points) of the oil containing reservoir, while the carbon dioxide being relatively less dense will tend to the upper regions of the formation. This allows for a condition referred to as "gravity override," where the carbon dioxide flows over the top of the water with the dissolved nonionic surfactant. As such, the components do not meet creating very little, if any, emulsion in the desired locations within the oil containing reservoir. Second, carbon dioxide tends to have more mobility in the oil containing reservoir where it can meet and form an emulsion with the water. This also allows for an emulsion to be formed in more locations within the oil containing reservoir, which can be important when long term mobility control is desired.

With respect to enhanced oil recovery operations, in one or more embodiments the modified nonionic surfactant formulations of the present disclosure can be injected into supercritical carbon dioxide that is being supplied through piping. In one embodiment, the modified nonionic surfactant formulations can be injected into the supercritical carbon dioxide using an injector. Examples of suitable injectors for this purpose include those disclosed in a co-pending U.S. patent application entitled "Solubilizing Surfactants into Supercritical Carbon Dioxide for Enhanced Oil Recovery" having U.S. Patent Application Ser. No. 61/351,510, which is incorporated herein by reference in its entirety.

For the various embodiments, the modified nonionic surfactant formulations of the present disclosure can be injected into the supercritical carbon dioxide at a concentration of 100 to 5000 parts-per-million, where the modified nonionic surfactant formulations is soluble in the supercritical carbon dioxide. As appreciated, other values for the concentration of the modified nonionic surfactant formulations injected into the supercritical carbon dioxide are possible. For example, considerations for determining these other concentration values can include, but are not limited to, the flow rates of the supercritical carbon dioxide, the solubility of the nonionic surfactant in the supercritical carbon dioxide, and/or the effectiveness of the nonionic surfactant in forming an emulsion with the supercritical carbon dioxide.

In one or more embodiments, the emulsion may be formed from shear flow. For example, the emulsion may be formed from shear flow occurring before and/or during injection into the oil containing reservoir and/or the emulsion may be formed from shear flow occurring within the oil containing reservoir. The emulsion can have a degree of stability for the oil recovery over varying conditions associated with the oil containing reservoir, including, but not limited to, temperature, pressure, and chemical conditions in the oil containing reservoir.

In one or more embodiments, the modified nonionic surfactant formulation of the present disclosure includes both a nonionic surfactant and a pour point depressant. Nonionic surfactants are usually organic compounds that are amphiphilic, meaning they contain both hydrophobic groups (alkylated phenol derivatives, fatty acids, linear or branched aliphatic alcohol, long-chain linear alcohols, etc.) and hydrophilic groups (generally derived from ethylene oxide, propylene oxide and/or butylene oxide and having various lengths), therefore they can be soluble in both organic solvents (non-polar) and polar solvents such as water. For example, the nonionic surfactants used in the modified nonionic surfactant formulations of the present disclosure can lower the interfacial tension between carbon dioxide (such as carbon dioxide in a supercritical state) and water. Nonionic surfactants are capable of dissolving in supercritical carbon dioxide in dilute concentrations, where they can help to stabilize carbon dioxide-in-water emulsions and/or foams (referred to herein as "emulsion"), as discussed herein.

Examples of nonionic surfactants for use with the modified nonionic surfactant formulations of the present disclosure include, but are not limited to, exthoxylated aliphatic alcohols, polyoxyethylene, carboxylic esters, polyethylene glycol esters, anhydrosorbitol ester and exthoxylated derivatives, glycol esters of fatty acids, carboxylic amides, monoalkanolamine condensates, polyoxyethylene fatty acid amides, branched alkylphenol alkoxylates, linear alkylphenol alkoxylates, and branched alkyl alkoxylates.

Specific examples of such nonionic surfactants can be found in "$CO_2$-Souble Surfactants for Improved Mobility Control" authored by Xing et al. (Society of Petroleum Engineers, SPE 129907, presented at the 2010 SPE Improved Oil Recovery Symposium, Tulsa Okla., 24-28 Apr. 2010), which is incorporated herein by reference in its entirety. In one or more embodiments, examples of surfactants useful with the present disclosure can also be found in U.S. Pat. No. 6,686,438 to Beckman and U.S. Pat. No. 5,789,505 to Wilkinson, and the U.S. patent application entitled "Compositions for Oil Recovery and Methods of Their Use," U.S. Pat. Application Ser. No. 61/196,235.

Desirable attributes of these nonionic surfactants can include, but are not limited to, one or more of the following: (1) being soluble in supercritical carbon dioxide at pressures that range from 6800 kPa to 69000 kPa and temperatures from 25° C. to 150° C.; (2) those having fluorous and/or non-fluorous composition; (3) those having $CO_2$-philic hydrocarbon tails of linear alkyl chains, branched alkyl chains, linear alkylphenol chains, and/or branched alkylphenol chains; (4) those having ethylene oxide segments (polyethylene glycol, PEG), polypropylene oxide segments, polypropylene glycol (PPG) hydrophiles, and PPG-PEG diblock hydrophiles; (5) being water soluble in addition to being soluble in carbon dioxide; (6) be in a liquid phase at operational temperature (e.g., −50° C., −40° C., −30° C., −20° C., −10° C., or 0° C.) and pressure; and (7) effective at dilute concentrations in the supercritical carbon dioxide of 0.01 to 5 weight percent or 100 to 5000 ppm. Other nonionic surfactants that are sufficiently soluble in supercritical carbon dioxide and that can generate carbon dioxide-in-water emulsions are also known.

The modified nonionic surfactant formulations of the present disclosure can be used in a variety of applications for enhanced oil recovery. These uses include, but are not limited to, enhanced mobility control, to block off highly permeable water-out zones via the water-alternating-gas with the surfactant dissolved in the supercritical carbon dioxide (also known as "WAG") process and/or in injecting the modified nonionic surfactant formulation into carbon dioxide (with or without alternate injections of water), such as supercritical carbon dioxide, that is being supplied to an oil containing reservoir. Other processes in which could be used to inject and/or introduce the modified nonionic surfactant formulations of the present disclosure into carbon dioxide for use in enhanced oil recovery are also known.

Embodiments of the method of the present disclosure can include introducing the modified nonionic surfactant formulation into a flow of carbon dioxide (e.g., supercritical carbon dioxide). As discussed herein, the modified nonionic surfactant formulation can include a nonionic surfactant and the pour point depressant, where the pour point depressant helps the modified nonionic surfactant formulation to achieve a pour point of −3° C. to −54° C. In one or more embodiments, the pour point depressant can be used to achieve other pour point values that may be useful. These other values include, but are not limited to −40° C., −30° C., −20° C. or −10° C.

The flow of carbon dioxide and the modified nonionic surfactant formulation can be injected into the oil containing reservoir, where the carbon dioxide and the nonionic surfactant form an emulsion in the aqueous solution in the oil containing reservoir. As discussed herein, the pour point depressant provides minimal interference in forming the emulsion. In one or more embodiments, the pour point depressant may provide no interference in forming the emulsion. Providing no interference in forming the emulsion may be identified by essentially identical foams and foam characteristics being achieved with both the modified nonionic surfactant formulation of the present disclosure and the nonionic surfactant without the pour point depressant under similar concentrations and conditions.

In one or more embodiments, the pour point depressant used to form the modified nonionic surfactant formulation of the present disclosure can include an alcohol. In one or more embodiments, alcohol may be selected from the group consisting of glycols, glycol ethers, methanol, ethanol and combinations thereof. In one or more embodiments, the pour point depressant can include a hydrocarbon. In one or more embodiments, the hydrocarbon can be a C4 to C10 hydrocarbon, having linear structure, a branched structure and a combination thereof. Hexanes are one example of such hydrocarbons. In one or more embodiments, the pour point depressant may be selected from the group consisting of an ester, a ketone (e.g., acetone, methyl ethyl ketone, ethyl acetate), an amide and combinations thereof. Combinations of the compounds recited herein for the pour point depressant may also be possible. So, for example, a combination of an alcohol, a ketone, and/or a hydrocarbon is possible, among others.

Specific examples of potentially suitable pour point depressants include, but are not limited to, alcohols such as, but not limited to, isopropanol, diethyleneglycol monobutyl ether, ethyleneglycol monobutyl ether, diethylene glycol monoethyl ether, ethyleneglycol monobutylether, ethyleneglycol monopropylether, dipropyleneglycol monomethyl ether, dipropyleneglycol monobutyl ether, propylene glycol monomethyl ether, propyleneglycol monopropyl ether, propyleneglycol monobutyl ether, butyl acetate, propyleneglycol, ethyleneglycol, and combinations thereof. Specific examples of potentially suitable pour point depressants can also include, but are not limited to, esters such as, but not limited to, ethyleneglycol monobutyl ether acetate, propyleneglycol diacetate, propylene glycol monomethyl ether acetate, dipropyleneglycol dimethyl ether, and combinations thereof.

In one or more embodiments, the pour point depressant can include water, in addition to the pour point depressants provided herein. In one or more embodiments, the amount of water used in the pour point depressant may be from 1 to 90 weight percent water. In one or more embodiments, the amount of water used in the pour point depressant may be from 10 to 20 weight percent water. For example, the modified nonionic surfactant can include 10 weight percent of the alcohol and 20 weight percent water.

In one or more embodiments, the modified nonionic surfactant formulation may include a pour point depressant that is 10 to 50 weight percent of the modified nonionic surfactant formulation. In one or more embodiments, the modified nonionic surfactant formulation may include a pour point depressant that is 10 to 30 weight percent of the modified nonionic surfactant formulation. For the embodiments where the modified nonionic surfactant formulation includes 10 to 30 weight percent of the pour point depressant the remainder of the modified nonionic surfactant formulation can be the nonionic surfactant (e.g., 90 to 70 weight percent of the nonionic surfactant). For example, the modified nonionic surfactant formulation can includes 30 weight percent of the pour point depressant and 70 weight percent of the nonionic surfactant. In another example, the modified nonionic surfactant formulation can includes 10 or 20 weight percent of the pour point depressant and 90 or 80 weight percent, respectively, of the nonionic surfactant. The pour point value for the modified nonionic surfactant formulation of the present application can be tested according to ASTM protocols, such as, but not limited to, ASTM D-97, among others.

Methods of the present disclosure may also include injecting the modified nonionic surfactant formulation into the oil containing reservoir where the modified nonionic surfactant formulation is first cooled to a temperature below 0° C. Cooling the modified nonionic surfactant formulation to a temperature below 0° C. can include moving (e.g., pumping) the modified nonionic surfactant formulation through piping that is exposed to the prevailing (e.g., ambient) temperatures and conditions in which the piping is present. Such ambient temperatures can include 0° C. to −54° C. In other words, the piping that is used to contain and transport the modified nonionic surfactant formulation of the present disclosure can have a least a portion of the piping in the outside environment where heat, if any, can be removed by the surrounding environment from the modified nonionic surfactant formulation during transport through the piping.

In one or more embodiments, the modified nonionic surfactant formulation cooled to a temperature below 0° C. can then be introduced into carbon dioxide, as discussed herein, where the carbon dioxide and the modified nonionic surfactant formulation can be injected into the oil containing reservoir. So, it is possible to introduce the modified nonionic surfactant formulation at an ambient temperature of 0° C. to −54° C. into the flow of carbon dioxide. The carbon dioxide and the nonionic surfactant can then form an emulsion from in the aqueous solution in the oil containing reservoir, as discussed herein.

Although embodiments described herein include supercritical carbon dioxide as the noncondensable gas in compositions of the present disclosure, one skilled in the art will appreciate that other noncondensable gases may also be included in place of supercritical carbon dioxide and/or in addition to supercritical carbon dioxide. Examples of other possible noncondensable gases include, but are not limited to, nitrogen, natural gas, methane, propane, butane, ethane, ethylene, hydrogen sulfide, carbonyl sulfide, air, combustion flue gas, mixtures of methane with ethane, argon, light hydrocarbons, and mixtures thereof, among others.

In some embodiments, compositions of the present disclosure can include other additives. For example, the composition can include corrosion inhibitors, co-surfactants, scale inhibitors, mixtures thereof, as well as other additives. In some embodiments, the total amount of the additives added to the compositions of the present disclosure is not greater than about 5 weight percent, based on a total weight of the composition.

EXAMPLES

Pour Point Measurements
Pour point measurements were taken as follows. Pour points were measured using an Instrumentation de Scientifique de Laboratoire pour point instrument (model MPP 5GS) following the ASTM D-97 standard test method. The pour points values were measured in increments of 3° C.

Carbon Dioxide Solubility/Cloud Point Measurements

Carbon dioxide solubility measurements were taken as follows. Cloud point measurements in supercritical carbon dioxide were performed with a Temco Pendant drop Interfacial Tension IFT-820-P instrument (Temco, Inc. Tulsa Okla.), which was modified so that the IFT cell can provide measurements of nonionic surfactant solubility in supercritical carbon dioxide (carbon dioxide held at or above its critical temperature and critical pressure) at high pressures (up to 5000 pounds per square inch (psi)) and temperatures (up to 176° C.). The re-engineered cell is referred to herein as a Pressure-Volume-Temperature (PVT) cell. The PVT cell consists of a small pressure vessel (42 mL volume), two heater bands, insulating jackets, and two high-pressure, tempered borosilicate glass windows to facilitate viewing the interior of the cell. A diffuse light source was placed on one window to illuminate the interior of the cell, and a Ramé-Hart video microscope was used on the other window to take pictures of cell interior.

Since the PVT cell has a fixed volume, an accumulator was placed (1 liter in volume) in line to the system to vary the pressure inside the PVT cell by pumping fluid to or from the accumulator in to the PVT cell. The accumulator was manufactured at OFI Testing Equipment, Inc. (Houston, Tex.). One side of the accumulator was connected to the PVT cell and was designed to hold liquid carbon dioxide, the other side was plumbed up to deionized (DI) water. A floating piston separates the two sides. The accumulator was housed inside a Blue M oven (model # DC-256-B-ST350, Thermal Product Solutions), so the entire accumulator could be heated to the same temperature as the PVT cell. The tubing running from the accumulator to the PVT cell was insulated to prevent heat loss. A Haskel MS-71 air driven liquid pump (Pneumatic and Hydraulic Co., Houston, Tex.) was used to adjust the pressure of the water side of the accumulator, thereby adjusting the pressure inside the PVT cell. A Tescom 6000 psi back pressure regulator (Emerson Process Management) was installed on the water line to regulate the pressure of the water side of the accumulator. Lastly, a liquid carbon dioxide feed line was added to the PVT/accumulator tubing system, with another Haskel MS-71 air driven liquid pump to aid in pumping up the liquid carbon dioxide pressure in the system. The spring inside this MS-71 pump was removed so the pump piston would operate more slowly to avoid flashing carbon dioxide inside the pump cavity.

The total volume of the PVT cell, accumulator and all associated tubing was estimated to be approximately 1050 milliliters (mL). The cell and tubing volume was estimated to be about 50 mL, while the accumulator volume was measured to be 1000 mL. For cloud point measurements, the accumulator was filled with 500 mL of liquid carbon dioxide. At 20° C. the density of liquid carbon dioxide is approximately 0.774 g/mL. Thus the total mass of carbon dioxide in the PVT cell system was calculated to about 385 grams; 29.3 grams in the cell, and 355.7 grams in the accumulator. Based on the total mass of carbon dioxide in the cell, the nonionic surfactant of the present disclosure was added to the system at approximately 1000 parts per million (ppm). The requisite amount of the nonionic surfactant (approximately 0.385 g) addition was performed prior to filling the cell and accumulator with carbon dioxide. Approximately 0.046 g was added in to the PVT cell and 0.355 g was added in to the carbon dioxide side of the accumulator. If the nonionic surfactant was solid, it was melted at 50° C. and then added in to the system. Before adding the carbon dioxide, the accumulator was pumped full of water to move the piston over to the carbon dioxide side to "zero" the volume. The nonionic surfactant was added to the tubing entering the carbon dioxide side. 500 mL of water was drained from the water side of the accumulator so as to allow 500 mL of liquid carbon dioxide to enter the carbon dioxide side and mix with the surfactant. A Haskel MS-71 carbon dioxide feed pump was used to pressurize the entire system to approximately 2300 psi before closing the carbon dioxide feed line. At this point the system was allowed to equilibrate for a few minutes to allow the surfactant to diffuse into the carbon dioxide phase, and for the carbon dioxide to permeate into all the o-rings throughout the system.

The cell and oven temperatures were set at the lowest starting test temperature (usually 40° C.) and the Haskel MS-71 water pump was used to increase the system pressure until the interior of the PVT cell was completely clear (usually about 2500 psi). The Ramé-Hart video microscope mounted in front of one borosilicate glass cell window displays the PVT cell interior on a computer screen. Alternately the PVT cell interior could be viewed via a mirror through the same window. The opposite window was equipped with a light source for illuminating the cell interior for the camera.

The system was allowed to equilibrate for approximately 2 hours in this state in order to reach equilibrium at the temperature set point. After equilibration, the Tescom 6000 psi back pressure regulator was used on the water line to slowly decrease the system pressure until the surfactant began to precipitate out of solution. The pressure was recorded at which the first sign of precipitation was observed. This is referred to as the cloud point of the surfactant at the given temperature. Lower cloud point pressures indicate higher carbon dioxide solubility of the nonionic surfactant at the given test temperature.

Synthesis of Nonionic Surfactants

Nonionic Surfactant A

Nonionic surfactant A was produced as follows. Purge a 9 Liter (L) reactor with nitrogen. Charge the 9 L reactor with 550 grams of 2-ethyl-1-hexanol and add 6.2 grams of potassium hydroxide pellets. Vent the reactor seven times with nitrogen to remove atmospheric oxygen. Pressurize the rector with nitrogen to 16 to 20 pounds per square inch absolute (psia) (103-138 KPa) at ambient temperature (approximately 23° C.). Remove a portion of the reactor contents (92.8 g) for residual water analysis. Heat the reactor contents, with agitation, to 130° C. Meter 1115 grams of propylene oxide (PO) into the reactor over several hours at 130° C. After the PO feed is complete, agitate the reactor contents at reaction temperature (130° C.) to consume unreacted oxide (digest) and then cool to 60° C.

Remove a portion of the reactor contents (133.5 g), and analyze for hydroxyl content (4.014% OH or 423 MW). Heat the remaining 1483.4 g of reactor contents, with agitation, to 130° C. Meter 2160 grams of ethylene oxide (EO) into the reactor over several hours. After the EO feed is complete, agitate the reactor contents at reaction temperature (130° C.) to consume unreacted oxide, and then cool to 65° C. Neutralize the reactor contents by slurrying with magnesium silicate (Magnesol® XL, 200 g) and water (10 g) and filter to give the Nonionic Surfactant A. A total of 2361 g of the Nonionic Surfactant A was collected after filtering. A hydroxyl content of 1.677% corresponding to a molecular weight of 1014 was measured for the final product.

Nonionic Surfactant B

Nonionic Surfactant B was produced as follows. Purge a 9 Liter (L) reactor with nitrogen. Charge the 9 L reactor with 846 grams of 2-ethyl-1-hexanol and add 2.98 grams of potassium hydroxide pellets. Vent the reactor seven times with nitrogen to remove atmospheric oxygen. Pressurize the rector with nitrogen to 16 to 20 pounds per square inch absolute (psia) (103-138 KPa) at ambient temperature (approximately 23° C.). Remove a portion of the reactor contents (92.8 g) for residual water analysis. Heat the reactor contents, with agitation, to 130° C. Meter 1780 grams of propylene oxide (PO) into the reactor over several hours at 130° C. After the PO feed is complete, agitate the reactor contents at reaction temperature (130° C.) to consume unreacted oxide (digest) and then cool to 60° C.

Remove a portion of the reactor contents (144.1 g and analyze for hydroxyl content (4.209% OH or 412.7 MW). Heat the remaining 2463.4 g of reactor contents, with agitation, to 130° C. Meter 2140 grams of ethylene oxide (EO) into the reactor over several hours. After the EO feed is complete, agitate the reactor contents at reaction temperature (130° C.) to consume unreacted oxide, and then cool to 65° C. Neutralize the reactor contents by slurrying with magnesium silicate (Magnesol® XL, 200 g) and water (10 g) and filter to give the Nonionic Surfactant B. A total of 3700 g of the Nonionic Surfactant B was collected after filtering. A hydroxyl content of 2.387% corresponding to a molecular weight of 712 was measured for the final product.

Hydroxyl Content

Hydroxyl content of Nonionic Surfactant A and Nonionic Surfactant B was determined as follows. Use ASTM D 4274 to measure hydroxyl content by derivitization of the polyglycol with an excess of phthalic anhydride reagent with imidazole catalyst in pyridine solvent at 100° C. for 30 minutes. After formation of the phthalate half ester, the unreacted phthalic anhydride is hydrolyzed and titrated with 1 Normal sodium hydroxide using a Mettler DL-55 titrator. Quantify the half ester by the difference between the sample titration and a blank titration of the same amount of phthalic anhydride reagent completely hydrolyzed with water. The difference is expressed as hydroxyl number (mg KOH/g sample) or percent OH (OH %).

Core Flooding Experiments

Core flooding experiments were performed as follows. Core flooding experiments were performed in a core flooding rig (FRT 6100) supplied by Chandler Engineering. The set up consists of two core holders, A and B, which can be used simultaneously or separately. The flow of fluids in the rig can be controlled by keeping the valves open or closed. Fluid within the core holders always flowed in the injection mode: top to bottom. Differential pressure transducers measured the pressure drop across the cores. The maximum pressure drop limit measurable by these pressure drop transducers was 50 psi. If the pressure drop exceeded 50 psi, the pressure drop across the core was measured by taking the difference between the cell inlet and cell outlet pressure transducers. The pressure at the cell outlet is controlled by a backpressure regulator. The backpressure regulator supplied was a dome type regulator which provided more precise control over liquid flow, especially when two phases are flowing. The pressure was applied to the dome type backpressure regulator by a 6000 psi high pressure $N_2$ line. The backpressure regulator had a maximum possible operating limit of 5000 psi.

Water or brine flow in the rig was controlled by a liquid Quizix QX series pump. A four valve manifold allowed flexibility of liquid selection. Liquid $CO_2$ was pumped in by a dual cylinder Quizix Q5000 series pump. Liquid $CO_2$ was supplied from an accumulator bank containing four accumulators, which in turn were supplied from an Airgas $CO_2$ cylinder 6-pack. These accumulators were filled with liquid $CO_2$ from the Airgas 6-pack and then pressurized by a booster pump which pumped liquid water into the opposite side of the accumulators containing $CO_2$. The pressure applied in the accumulators was approximately equal to the backpressure applied via the backpressure regulator. A check valve prevented the back flow of liquid from the Quizix QX pumps to the Quizix 5000 series pumps.

The cores (1.5 inch in diameter and 12 inches long) were held inside a rubber sleeve which was then inserted into the Hassler-type core holder. Since carbon dioxide will infiltrate most polymeric systems, the sleeves were made of Aflas 90 rubber (a high performance material which had high hardness and crosslink density, thus providing good resistance to $CO_2$). To provide further protection against $CO_2$ infiltration, the cores were wrapped in plastic wrap and aluminum foil and then placed inside the rubber sleeve. This outer wrapping provided an extra level of barrier between the $CO_2$ and the rubber sleeve. After 3-4 months of operation the sleeves were discarded and a new sleeve was put in place.

A confining pressure, usually in excess of 500 psi over the core line pressure, was applied externally on the sleeve to keep the cores locked in place. A hydraulic booster pump (Haskel MS-71) was used to apply the confining pressure whereas a Chandler white mineral oil was used as the hydraulic fluid. The core holders were also designed to perform experiments at elevated temperatures. Heater bands placed outside the core holder heated up the confining oil, which in turn heated up the rubber sleeve and cores inside them. The inlet line for fluid flowing in to the cores made a 'U' in the heated oil before it entered the cores, thereby allowing the injected fluids to be heated up before it entered the core. Furthermore an insulated steel enclosure was lowered over the core holders to prevent heat loss when experiments were running at elevated temperatures.

Details on experimental conditions under which the core flooding rig was operated has been provided below. Unless otherwise stated, all experiments were performed under identical conditions:

Mode of injection: Co-injection
Brine flow rate: 0.1 milliliter (ml)/minute (min)
$CO_2$ flow rate: 0.9 ml/min
Foam quality: 90%
Cores used: Buff Berea sandstone 200-300 mD air permeability (Kocurek Industries)
Core dimensions: 1.5 inch diameter×12 inches long
Temperature: Room temperature (23° C.)
Backpressure regulator: 1500 psi
Modified Nonionic Surfactant concentration in brine: 1 weight percent (wt. %, 10000 ppm)
Brine Composition: 3 wt. % NaCl Experiments were performed in the co-injection mode where the brine and $CO_2$ were simultaneously co-injected at the desired rates. Under these conditions an equilibrium pressure drop was obtained across the core. Typically a minimum of 8-12 hours was provided for steady state to be obtained. Before starting the experiment the rock core was saturated with surfactant solution. Subsequently carbon dioxide and surfactant solution was co-injected till an equilibrium pressure drop was reached across the core.

The collected data clearly shows the rise in pressure drop over time, thereby indicating the formation of foam in the core. The pressure drop eventually reaches steady state after approximately 10 hours.

Experimental Results

Comparative Examples A-N

Comparative Examples A-N were prepared by melting the nonionic surfactant A in a 50° C. oven (approximately 1 hour) and mixing 70 weight percent (wt. %) of the nonionic surfactant A with 30 wt. % of a Solvent as provided in Table 1. Pour point measurements were conducted on Comparative Examples A-N according to ASTM D-97, as provided here. The pour point for each of the Comparative Examples is provided in Table 1.

TABLE 1

| Comparative Example | 30 wt. % Solvent and 70 wt. % of Nonionic Surfactant A Solvent | Pour Point ° C. |
|---|---|---|
| A | Butyl acetate (The Dow Chemical Company) | 12 |
| B | Dowanol ™ DpnB (The Dow Chemical Company) | 18 |
| C | Isopropanol (The Dow Chemical Company) | 9 |
| D | Butyl Cellosolve (The Dow Chemical Company) | 6 |
| E | Propylene glycol (The Dow Chemical Company) | 9 |
| F | Dowanol ™ PnB (The Dow Chemical Company) | 12 |
| G | Dowanol ™ PMA (The Dow Chemical Company) | 9 |
| H | Butyl cellosolve acetate (The Dow Chemical Company) | 15 |
| I | Butyl Carbitol (The Dow Chemical Company) | 12 |
| J | Hexanes (Fisher) | 18 |
| K | Dowanol ™ PM (The Dow Chemical Company) | 3 |
| L | Methyl Carbitol (The Dow Chemical Company) | 6 |
| M | Propyl Cellosolve (The Dow Chemical Company) | 6 |
| N | Carbitol (The Dow Chemical Company) | 6 |

Examples 1-13 of the Modified Nonionic Surfactant Formulation

Examples 1-13 of the modified nonionic surfactant formulation were prepared by heating the nonionic surfactant A in a 50° C. oven for approximately 1 hour and then mixing 70 wt. % of the nonionic surfactant A with 30 wt % of the pour point depressant (10 wt. % solvent and 20 wt. % deionized (DI) water) as provided in Table 2. Pour point measurements were conducted on Examples 1-13 according to ASTM D-97 as provided here. The pour point for each of the Examples is provided in Table 2.

TABLE 2

| Example | 30 Wt. % Pour Point Depressant (10 wt. % Solvent:20 wt. % DI Water):70 wt. % of the Nonionic Surfactant A Solvent | Pour point ° C. |
|---|---|---|
| 1 | Butyl acetate | −30 |
| 2 | Dowanol ™ DpnB | −9 |
| 3 | Isopropanol | −48 |
| 4 | Butyl Cellosolve | −48 |
| 5 | Propylene glycol | −39 |
| 6 | Dowanol ™ PnB | −27 |
| 7 | Dowanol ™ PMA | −12 |
| 8 | Butyl cellosolve acetate | −15 |
| 9 | Butyl Carbitol | −12 |
| 10 | Dowanol ™ PM | −48 |
| 11 | Methyl Carbitol | −39 |
| 12 | Propyl Cellosolve | −51 |
| 13 | Carbitol | −45 |

As illustrated in Table 2, the pour point values for Example 1-13 are significantly lower than those of Comparative Examples A-N.

Examples 14-22 of the Modified Nonionic Surfactant Formulation

Examples 14-22 of the modified nonionic surfactant formulation were prepared by heating the nonionic surfactant A in a 50° C. oven for approximately 1 hour and then mixing 70 wt. % of the nonionic surfactant A with 30 wt % of the pour point depressant (20 wt. % solvent and 10 wt. % DI water) as provided in Table 3. Pour point measurements were conducted on Examples 14-22 according to ASTM D-97 as provided here. The pour point for each of the Examples is provided in Table 3.

TABLE 3

| Example | 30 wt. % Pour Point Depressant (20 wt. % Solvent:10 wt. % DI Water):70 wt. % of the Nonionic Surfactant A Solvent | Pour point ° C. |
|---|---|---|
| 14 | Butyl acetate | −12 |
| 15 | Dowanol ™ DpnB | −9 |
| 16 | Isopropanol | −12 |
| 17 | Butyl Cellosolve | −9 |
| 18 | Dowanol ™ PMA | −12 |
| 19 | Dowanol ™ PM | −15 |
| 20 | Methyl Carbitol | −3 |
| 21 | Propyl Cellosolve | −15 |
| 22 | Carbitol | −3 |

As illustrated in Table 3, the pour point values for Example 14-22 are significantly lower than those of Comparative Examples A-N.

Comparative Examples O-BF

Comparative Examples O-BF were prepared by melting the nonionic surfactant A in a 50° C. oven (approximately 1 hour) and mixing 70 wt. % of the nonionic surfactant A with 30 wt. % of a Solvent (15 wt. % Solvent 1+15 wt. % Solvent 2) as provided in Table 5. Pour point measurements were conducted on Comparative Examples O-BF according to ASTM D-97, as provided here. The pour point for each of the Comparative Examples is provided in Table 5.

TABLE 5

| Comparative Example | 30 wt. % Solvent (1:1 Solvent 1:Solvent 2) in 70 wt. % of the Nonionic Surfactant A | | Pour Point ° C. |
|---|---|---|---|
| | Solvent 1 | Solvent 2 | |
| O | Propylene glycol | Butyl Cellosolve | 6.0 |
| P | Propylene glycol | Dowanol ™ PnB | 3.0 |
| Q | Propylene glycol | Dowanol ™ PMA | 0.0 |
| R | Propylene glycol | Butyl Cellosolve Acetate | 0.0 |
| S | Propylene glycol | Butyl Carbtiol | 3.0 |
| T | Propylene glycol | Dowanol ™ PM | 0.0 |
| U | Propylene glycol | Methyl Carbitol | 3.0 |
| V | Propylene glycol | Propyl Cellosolve | 0.0 |
| W | Propylene glycol | Carbitol | 3.0 |
| X | Propylene glycol | Dowanol ™ DpnB | 6.0 |
| Y | Butyl Cellosolve | Dowanol ™ PnB | 3.0 |
| Z | Butyl Cellosolve | Dowanol ™ PMA | 6.0 |
| AB | Butyl Cellosolve | Butyl Cellosolve Acetate | 9.0 |
| AC | Butyl Cellosolve | Butyl Carbtiol | 9.0 |
| AD | Butyl Cellosolve | Dowanol ™ PM | 6.0 |
| AE | Butyl Cellosolve | Methyl Carbitol | 9.0 |
| AF | Butyl Cellosolve | Propyl Cellosolve | 9.0 |
| AG | Butyl Cellosolve | Carbitol | 9.0 |
| AH | Butyl Cellosolve | Dowanol ™ DpnB | 12.0 |
| AI | Dowanol ™ PMA | Butyl Cellosolve | 6.0 |
| AJ | Dowanol ™ PMA | Dowanol ™ PnB | 9.0 |
| AK | Dowanol ™ PMA | Butyl Cellosolve Acetate | 9.0 |
| AL | Dowanol ™ PMA | Butyl Carbtiol | 9.0 |
| AM | Dowanol ™ PMA | Dowanol ™ PM | 6.0 |
| AN | Dowanol ™ PMA | Methyl Carbitol | 6.0 |
| AO | Dowanoi ™ PMA | Propyl Cellosolve | 6.0 |
| AP | Dowanol ™ PMA | Carbitol | 6.0 |
| AQ | Dowanol ™ PMA | Dowanol ™ DpnB | 9.0 |
| AR | Ethylene glycol | Butyl Cellosolve | 0.0 |
| AS | Ethylene glycol | Butyl Cellosolve | 0.0 |
| AT | Ethylene glycol | Dowanol ™ PnB | 0.0 |
| AU | Ethylene glycol | Dowanol ™ PMA | 0.0 |
| AV | Ethylene glycol | Butyl Cellosolve Acetate | 0.0 |
| AW | Ethylene glycol | Butyl Carbtiol | 0.0 |
| AX | Ethylene glycol | Butyl Carbtiol | 0.0 |
| AY | Ethylene glycol | Dowanol ™ PM | 0.0 |
| AZ | Ethylene glycol | Methyl Carbitol | 0.0 |
| BC | Ethylene glycol | Propyl Cellosolve | 0.0 |
| BD | Ethylene glycol | Carbitol | 0.0 |
| BE | Ethylene glycol | Dowanol ™ DpnB | 3.0 |
| BF | Ethylene glycol | Dowanol ™ DpnB | 3.0 |

As illustrated in Table 5, the pour point values for Comparative Examples O-BF are significantly higher than those of Examples 1-22. Comparative Examples O-BF evaluated whether any formulations not containing water could provide a low pour point. As illustrated, Examples 1-22 illustrate that pour point values are lower when the modified nonionic surfactant formulation contains water.

Examples 23-26 of the Modified Nonionic Surfactant Formulation

Examples 23-26 of the modified nonionic surfactant formulation were prepared by heating the nonionic surfactant B in a 50° C. oven for approximately 1 hour and then mixing the nonionic surfactant B with the pour point depressant as provided in Table 6. Pour point measurements were conducted on Examples 23-26 according to ASTM D-97 as provided here. The pour point for each of the Examples is provided in Table 6.

TABLE 6

| Example | Nonionic Surfactant B (wt. %) | Wt. % Pour Point Depressant (2:1 weight ratio of DI Water:Propyl Cellosolve) | Pour Point (° C.) |
|---|---|---|---|
| 23 | 70 | 30 | −54 |
| 24 | 80 | 20 | −36 |
| 25 | 85 | 15 | −18 |
| 26 | 90 | 10 | −6 |

As illustrated in Table 6, the pour point values for Example 23-26 are significantly lower than those of Comparative Examples A-N.

$CO_2$ Cloud Point Measurements

Cloud point measurements were taken as provided herein. Cloud point values for several Examples of the modified nonionic surfactant formulation are provided in Table 7.

TABLE 7

| | 10 wt. % | 20 wt. % | Cloud Point (psi) | | |
|---|---|---|---|---|---|
| Example | Solvent 1 | DI Water | 40° C. | 60° C. | 80° C. |
| Nonionic Surfactant A | NA | NA | 2120 | 3180 | 3920 |
| 4 | Butyl Cellosolve | DI Water | 2070 | 3150 | 4120 |
| 10 | Dowanol ™ PM | DI Water | 2655 | 3550 | 4240 |
| 11 | Methyl Carbitol | DI Water | 2170 | 2920 | 3570 |
| 12 | Propyl Cellosolve | DI Water | 2210 | 3200 | 4060 |
| 13 | Carbitol | DI Water | 1910 | 2760 | 3500 |

Emulsion Performance

Figure 1B:
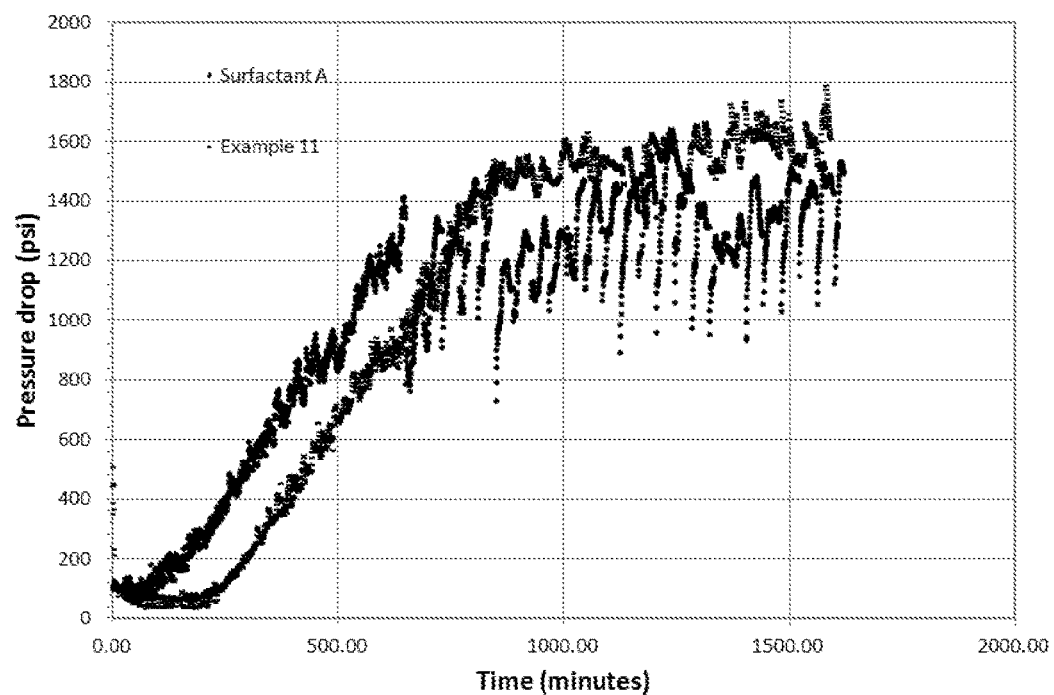
Figure 1C:
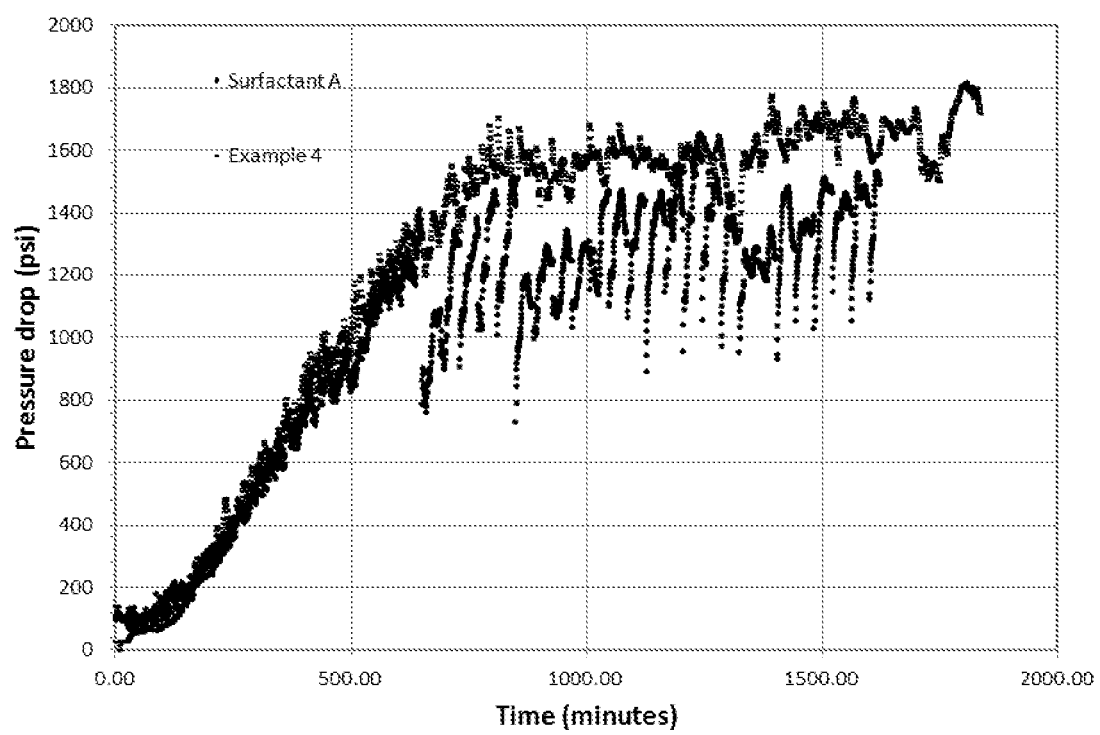

Examples 4, 11, and 13 of the modified nonionic surfactant formulation were tested for emulsion performance in the core flooding rig according to the Core Flooding Experiments protocol provided herein. The concentration of the surfactant in the brine is the active surfactant concentration. FIGS. 1A-1C provide the pressure drop across the core of the core flooding rig as a function of time for each of Examples 4, 11, and 13 and the nonionic surfactant A tested. As illustrated, the pour point depressant used in the modified nonionic surfactant formulation provides minimal interference (e.g., no interference) in forming an emulsion as compared to the use of the Nonionic Surfactant A.

It is to be understood that the above description has been made in an illustrative fashion, and not a restrictive one. Although specific embodiments have been illustrated and described herein, those of ordinary skill in the art will appreciate that other component arrangements can be substituted for the specific embodiments shown. The claims are intended to cover such adaptations or variations of various embodiments of the disclosure, except to the extent limited by the prior art.

In the foregoing Detailed Description, various features are grouped together in exemplary embodiments for the purpose of streamlining the disclosure. This method of disclosure is not to be interpreted as reflecting an intention that any claim requires more features than are expressly recited in the claim. Rather, as the following claims reflect, inventive subject matter lies in less than all features of a single disclosed embodiment. Thus, the following claims are hereby incorporated into the Detailed Description, with each claim standing on its own as a separate embodiment of the disclosure.

What is claimed:

1. A method, comprising:

introducing a modified nonionic surfactant formulation into a flow of carbon dioxide, where a portion of the carbon dioxide is in a supercritical phase, the modified nonionic surfactant formulation comprises 10 to 20 a weight percent of water, 10 to 30 weight percent of a pour point depressant and 50 to 80 weight percent of a nonionic surfactant, and where the modified nonionic surfactant formulation has a pour point of 0° C. to −51° C., wherein the pour point depressant is selected from isopropanol, diethyleneglycol monobutyl ether, ethyleneglycol monobutyl ether, diethylene glycol monoethyl ether, ethyleneglycol monobutylether, ethyleneglycol monopropylether, dipropyleneglycol monomethyl ether, propylene glycol monomethyl ether, propyleneglycol monopropyl ether, propyleneglycol monobutyl ether, butyl acetate, propyleneglycol, ethyleneglycol, ethyleneglycol monobutyl ether acetate, propyleneglycol diacetate, dipropyleneglycol dimethyl ether, and combinations thereof;

injecting the flow of carbon dioxide and the modified nonionic surfactant formulation into an oil containing reservoir; and forming an emulsion of the carbon dioxide and the nonionic surfactant in an aqueous solution in the oil containing reservoir.

2. The method of claim 1, where the use of the pour point depressant provides no interference in forming the emulsion.

3. The method of claim 1, where the modified nonionic surfactant formulation includes 20 weight percent water.

4. The method of claim 1, where the modified nonionic surfactant formulation includes 30 weight percent of the pour point depressant and 70 weight percent of the nonionic surfactant.

5. The method of claim 1, where the modified nonionic surfactant includes 10 weight percent of alcohol and 20 weight percent water.

6. The method of claim 1, where introducing the modified nonionic surfactant formulation includes introducing the modified nonionic surfactant formulation at an ambient temperature of 0° C. to −54° C. into the flow of carbon dioxide.

7. A method, comprising:

introducing a modified nonionic surfactant formulation into a flow of carbon dioxide, where a portion of the carbon dioxide is in a supercritical phase, the modified nonionic surfactant formulation comprises 10.5 to 20 weight percent of water, 10 to 30 weight percent of a pour point depressant and a remaining weight percent of a nonionic surfactant, and where the modified nonionic surfactant formulation has a pour point of 0° C. to −51° C., wherein the pour point depressant is selected from isopropanol, diethyleneglycol monobutyl ether, ethyleneglycol monobutyl ether, diethylene glycol monoethyl ether, ethyleneglycol monobutylether, ethyleneglycol monopropylether, dipropyleneglycol monomethyl ether, propylene glycol monomethyl ether, propyleneglycol monopropyl ether, propyleneglycol monobutyl ether, butyl acetate, propyleneglycol, ethyleneglycol, ethyleneglycol monobutyl ether acetate, propyleneglycol diacetate, dipropyleneglycol dimethyl ether, and combinations thereof;

injecting the flow of carbon dioxide and the modified nonionic surfactant formulation into an oil containing reservoir; and forming an emulsion of the carbon dioxide and the nonionic surfactant in an aqueous solution in the oil containing reservoir.

8. A method, comprising:

introducing a modified nonionic surfactant formulation into a flow of carbon dioxide, where a portion of the carbon dioxide is in a supercritical phase, the modified nonionic surfactant formulation includes 20 weight percent of water, 10 to 30 weight percent of a pour point depressant and a remaining weight percent of a nonionic surfactant, and where the modified nonionic surfactant formulation has a pour point of 0° C. to −51° C., wherein the pour point depressant is selected from isopropanol, diethyleneglycol monobutyl ether, ethyleneglycol monobutyl ether, diethylene glycol monoethyl ether, ethyleneglycol monobutylether, ethyleneglycol monopropylether, dipropyleneglycol monomethyl ether, propylene glycol monomethyl ether, propyleneglycol monopropyl ether, propyleneglycol monobutyl ether, butyl acetate, propyleneglycol, ethyleneglycol, ethyleneglycol monobutyl ether acetate, propyleneglycol diacetate, dipropyleneglycol dimethyl ether, and combinations thereof;

injecting the flow of carbon dioxide and the modified nonionic surfactant formulation into an oil containing reservoir; and forming an emulsion of the carbon dioxide and the nonionic surfactant in an aqueous solution in the oil containing reservoir.

\* \* \* \* \*